Figure 1:
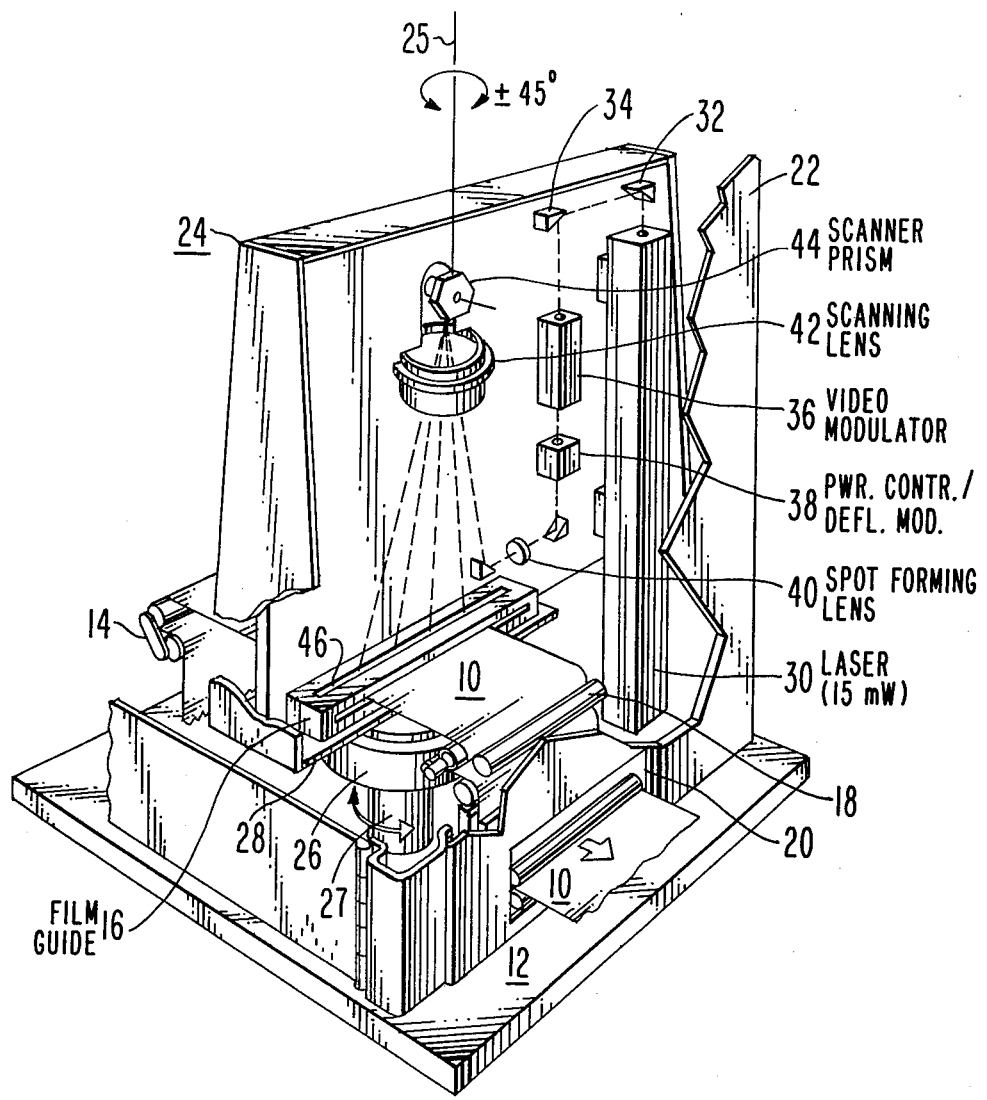

United States Patent [19]

Compton et al.

[11] 4,265,524
[45] May 5, 1981

[54] OPTICAL SCANNER WITH VARIABLE SCAN LINE ANGLE

[75] Inventors: Bertram L. Compton, Cherry Hill; Paul B. Pierson, Delran, both of N.J.

[73] Assignee: RCA Corporation, New York, N.Y.

[21] Appl. No.: 137,824

[22] Filed: Apr. 4, 1980

[51] Int. Cl.³ .................... G01D 15/14; H04N 1/24; G03B 27/68

[52] U.S. Cl. .................................. 354/65; 346/108; 346/110 R; 358/109

[58] Field of Search .................. 354/65, 70–74; 358/109; 355/52; 346/108, 110 R; 343/5 PC

[56] References Cited

U.S. PATENT DOCUMENTS

| | | | |
|---|---|---|---|
| 2,859,653 | 11/1958 | Blackstone et al. | 343/5 PC |
| 2,945,414 | 7/1960 | Blackstone | 358/109 |
| 3,046,661 | 7/1962 | Kargl | 354/65 X |
| 3,143,732 | 8/1964 | Leighton et al. | 346/110 R X |
| 3,184,735 | 5/1965 | Chapman et al. | 346/110 R X |
| 3,269,290 | 8/1966 | Lysle | 354/65 X |
| 3,719,775 | 3/1973 | Takaoka et al. | 346/108 X |
| 3,739,699 | 6/1973 | Colterjohn et al. | 354/65 |
| 3,952,151 | 4/1976 | Jenkin | 358/109 |
| 4,167,023 | 9/1979 | Bessette et al. | 358/127 |
| 4,180,822 | 12/1979 | Hudson et al. | 346/108 |

Primary Examiner—Donald A. Griffin
Attorney, Agent, or Firm—Samuel Cohen; Carl V. Olson

[57] ABSTRACT

A photographic recorder includes an optical scanner unit positioned to scan transverse lines across a photographic film driven slowly in a linear direction. The optical scanner unit is mounted for angular displacement, so that the scan-line across the film can be set to any angle in a range of about ±45 degrees relative to a line at right angles to the direction of motion of the film.

11 Claims, 4 Drawing Figures

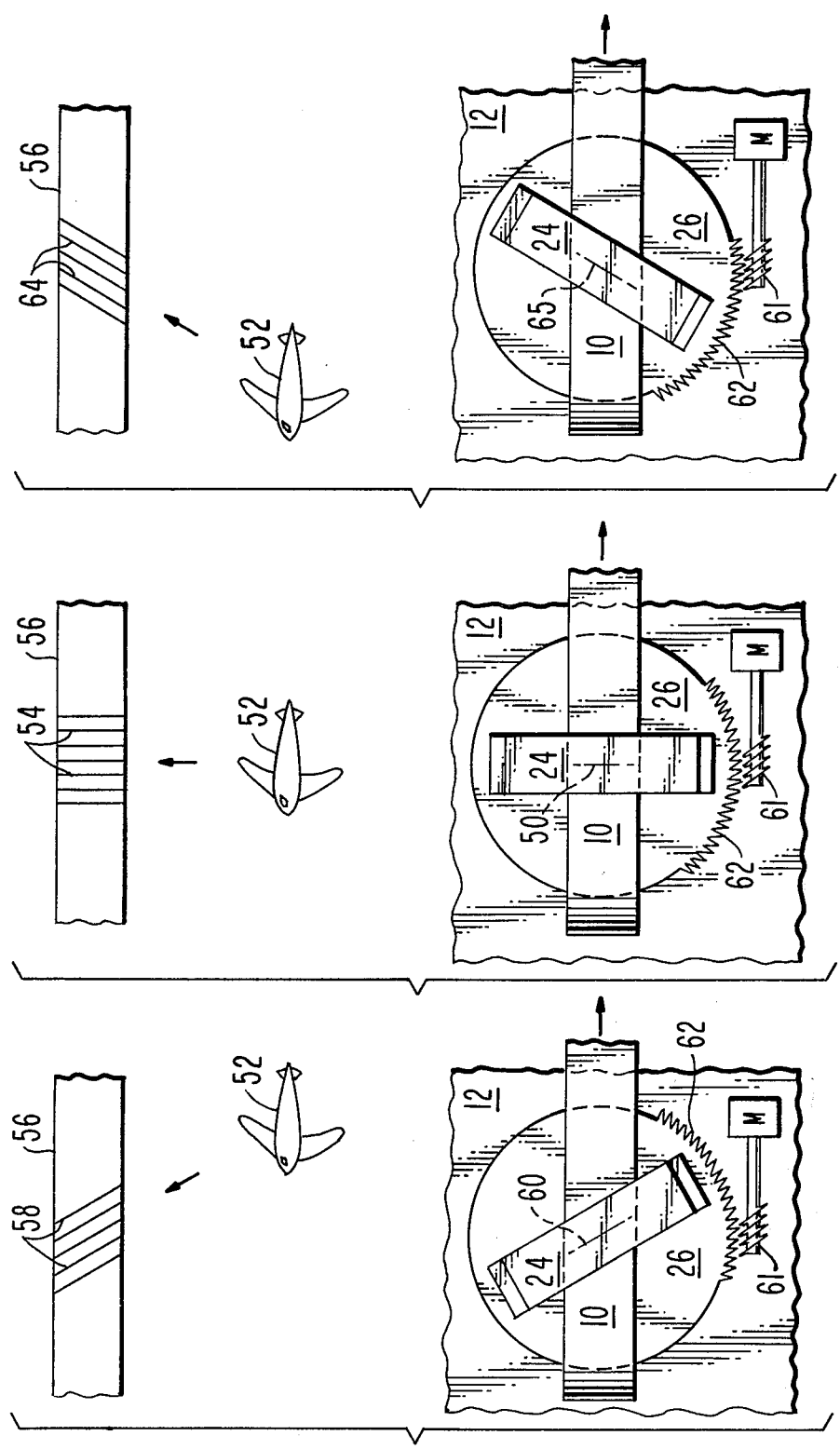

OPTICAL SCANNER WITH VARIABLE SCAN LINE ANGLE

This invention relates to optical line scanners, and is particularly useful as applied to an optical recorder in which a modulated laser beam is scanned transversely across a linearly-moving web of photographic recording film. In such recorders, the scanned line on the photographic film is at right angles to the direction of motion of the film. The graphic information being recorded on the film may be a video signal transmitted from a camera which scans transverse lines across the terrain beneath a photoreconnaissance aircraft.

There are occasions when lines scanned by the camera cannot be at right angles to the direction of motion of the aircraft, and are at a substantially different angle. In this case, the video signal from the camera must be passed through an electronic scan converter before being applied to the photographic recorder so that the recorded image will correctly reflect the terrain scanned by the camera. Such electronic converters are complex, and expensive, and increase the time required, following the scanning of a scene by the camera, to produce a useable photographic print of the scene.

A line scan recorder according to the present invention obviates the need for electronic scan conversion apparatus, and provides distortion-free recording of video signals obtained from a camera which scans lines that depart substantially from lines at right angles to the direction of motion of the camera. The angle of the scan lines across the film in the recorder is adjustable to be in conformity with the angle of the scan lines across the terrain by the camera.

In the drawing:

FIG. 1 is a perspective view, with portions of the enclosure cut away, showing a line scanning photographic recorder constructed according to the teachings of the invention; and FIGS. 2, 3 and 4 are simplified representations which will be referred to in describing the operation of the apparatus of FIG. 1 under three different conditions.

Reference is now made in greater detail to the recorder shown in FIG. 1. Photographic recording film 10 is driven and guided in a linear direction by means supported by a base 12. The film 10 is guided along a path from a supply roll (not shown) between rollers at 14, through a slotted film guide 16, over a number of guiding and driving rollers at 18 to an exit port 20 in an enclosure 22. The enclosure 22 and the film driving and guiding means 14, 18, 20 are stationary and fixed on base 12. However, the slotted film guide 16 is not stationary on base 12, but is part of a rotatable optical scanner unit or assembly 24 mounted on a rotatable support 26. The entire scanner unit 24 and support 26 are rotatable over a total angular displacement range of 90 degrees about an imaginary axis 25 which is perpendicular to the upper surface of film 10 and passes through a point in the middle of the width dimension of the film.

The support 26 is angularly displaced by means of an absolute angular position servo-motor 27 having a stator fixed to the base 12. The servo-motor operates in response to the application of an energizing current to rotate the rotor. An absolute optical encoder, including an encoding disk mounted on the rotor, produces a digital signal of about 15 binary digits representing the actual present angular position of rotor. When the actual digital signal equals the digital signal representing the desired angular position of the rotor, the motor current is turned off and the brake is energized to keep the rotor at the desired position. The digital signal representing the desired angular position may be a signal received from the camera in the aircraft, or from local, manually-set thumbwheel switches.

The line scanner unit 24 consists of a light-tight box having a bottom plate 28 fastened to rotatable support 26 and itself supporting the slotted film guide 16. The scanner box contains and supports a source 30 of a laser light beam which follows a path to the film 10 which includes reflectors 32 and 34, a video modulator 36 for modulating the laser light beam in intensity in accordance with a received electronic video signal, a power control and deflector modulator 38, a spot-forming lens 40 between two corner reflectors, a scanning lens 42, a motor-driven rotating multi-faceted line-scanning prism reflector 44, from which the beam is reflected back through the lens 42 and through a slot 46 in the film guide 16 to the photographic recording film 10. The construction details of the line scanner unit 24 may be similar in most respects to the one described in greater detail in U.S. Pat. No. 4,180,822 issued on Dec. 25, 1979, to K. C. Hudson, et al. on an "Optical Scanner and Recorder", which patent has the same assignee as the present case.

The present line scanner unit 24 differs from prior art arrangements in that it is mounted on a rotatable support 26 for angular displacement about an imaginary axis 25. The amount of angular displacement is in a range of 90 degrees, or plus or minus 45 degrees from a central reference position in which the line scanned by the light beam on the photographic film is at right angles to the linear direction of motion of the film. In the operation of the recorder of FIG. 1, the path of the photographic film 10 does not change, but the line scanner unit 24 of the recorder, including the film guide 16, can be angularly displaced as much as 45 degrees in either direction from the position shown in FIG. 1.

The normal reference condition of the recorder as shown in FIG. 1 is illustrated in the simplified diagram of FIG. 3. The line scanner unit 24 scans a line 50 on the film 10 which is at right angles to the direction of motion of the film 10. This reference condition of the film recorder is appropriate when recording a video signal from an aircraft 52 having a camera scanning lines 54 on terrain at right angles to a path 56 parallel to the path of the aircraft. The image recorded on film 10 is an undistorted version of the terrain scanned by the camera in the aircraft.

FIG. 2 shows an angular displacement setting of the line scanner in the film recorder which produces an undistorted image on the film from a video signal generated by a camera scanning the terrain along scan lines 58. The recorder scan line 60 has the same angle relative to the linear dimension of film that the camera scan line has to the direction of the path 56 on the terrain. The line scanner 24 is angularly displaced from the position shown in FIG. 3 to the position shown in FIG. 2 by means functionally illustrated as a motor M acting through a worm gear 61 engaged with gear teeth 62 on rotatable support 26.

The motor M always keeps the line scanner unit 24 at the same angle relative to the path of the recording medium 10 that the camera scanner in the aircraft 52 has relative to the direction of flight of the aircraft. The angular correspondence of the line scanner unit 24 on the ground with the camera scanner in the aircraft is maintained by means of electrical signals representing the position of the camera scanner which are transmitted via a radio link from the aircraft to the recorder on the ground.

FIG. 4 shows an angular displacement setting in the recorder in the opposite direction, which is the setting appropriate when the camera in the aircraft 52 scans lines 64 at the angle shown. The servo-motor M is operative in response to a signal from the aircraft to set the line scanner to a suitable angular position 65 within a range of ±45 degrees relative to the position shown in FIG. 3. Again, the recorder scan line, 65 in this case, has the same angle relative to the linear dimension of the film that the camera scan line has relative to the direction of path 56 along the terrain.

What is claimed is:

1. The combination of
   a base,
   linear drive means mounted on said base to drive an elongated flat web in a linear direction,
   a line scanner unit positioned to scan transverse lines across a surface of said web, and
   means mounted on said base to support said entire line scanner unit and rotate it within an angular displacement range about an imaginary axis normal to said surface of said web.
2. The combination according to claim 1 wherein said web is a recording medium.
3. The combination according to claim 2 wherein said web is a photographic recording medium.
4. The combination of claim 3 wherein said line scanner unit includes a source of a light beam and a motor-driven multi-faceted prism-reflector.
5. The combination of claim 4 wherein said source of a light beam is a laser.
6. The combination of claim 2 wherein said line scanner unit includes a source of a light beam and a motor-driver multi-faceted prism-reflector.
7. The combination according to claim 1 wherein said imaginary axis passes through the middle of the width dimension of said web.
8. The combination according to claim 1 wherein said angular displacement range is about 90 degrees.
9. The combination according to claim 8 wherein said angular displacement range is within ±45 degrees from a line at right angles to the linear dimension of the web.
10. A recorder, comprising
    a base,
    linear drive means mounted on said base to slowly drive an elongated flat photographic recording medium in a linear direction,
    an optical line scanner unit positioned to scan transverse lines across a surface of said elongated recording medium, and
    means mounted on said base to support said entire scanner unit and rotate it within an angular displacement range of about 90 degrees about an imaginary axis normal to said recording medium surface and passing through the middle of the width dimension of the recording medium, so that the scan line can be set at any desired angular displacement within a range of about ±45 degrees relative to a scan line at right angles with the linear dimension of the elongated recording medium.
11. In a system including an aircraft having camera means operative to scan a path on terrain passed over by the aircraft by scan lines which have angles within a range of about ±45 degrees from a direction perpendicular to the direction of flight of the aircraft, the improvement comprising
    recorder means operative to scan a moving elongated flat web of recording material by scan lines having the same angle within a range of about ±45 degrees to the direction of movement of the web as the camera scan lines have to the direction of flight of the aircraft.

* * * * *

UNITED STATES PATENT AND TRADEMARK OFFICE
CERTIFICATE OF CORRECTION

PATENT NO. : 4,265,524
DATED : May 5, 1981
INVENTOR(S) : Bertram L. Compton et al It is certified that error appears in the above—identified patent and that said Letters Patent is hereby corrected as shown below:

Claim 6, line 3, "driver" should be --driven--.

Signed and Sealed this

Twentieth Day of October 1981

[SEAL]

Attest:

GERALD J. MOSSINGHOFF

Attesting Officer    Commissioner of Patents and Trademarks